US008672091B2

(12) United States Patent
Rainey et al.

(10) Patent No.: US 8,672,091 B2
(45) Date of Patent: Mar. 18, 2014

(54) PERSONNEL SAFETY APPARATUS FOR A MACHINE

(75) Inventors: Timothy W. Rainey, Montgomery, IL (US); Joshua Charles Bedyk, Sandwich, IL (US); Dennis D. Wetterich, Newark, IL (US)

(73) Assignee: Caterpillar Inc., Peoria, IL (US)

( * ) Notice: Subject to any disclaimer, the term of this patent is extended or adjusted under 35 U.S.C. 154(b) by 240 days.

(21) Appl. No.: 13/089,755

(22) Filed: Apr. 19, 2011

(65) Prior Publication Data

US 2012/0267192 A1 Oct. 25, 2012

(51) Int. Cl.
*A62B 35/00* (2006.01)

(52) U.S. Cl.
USPC ...... 182/36; 182/3; 182/4; 104/106; 104/107; 104/108; 104/109; 104/111

(58) Field of Classification Search
USPC .............. 52/27, 182; 104/106, 107, 108, 109, 104/110, 111; 182/36, 3, 4, 231
See application file for complete search history.

(56) References Cited

U.S. PATENT DOCUMENTS

| 2,589,803 | A | * | 3/1952 | Haley | 104/94 |
| 2,871,915 | A | * | 2/1959 | Hogan | 482/69 |
| 3,780,663 | A | * | 12/1973 | Pettit | 104/307 |
| 3,985,082 | A | * | 10/1976 | Barac | 104/89 |
| 4,253,287 | A | * | 3/1981 | Overmoe | 52/184 |
| 4,556,123 | A | * | 12/1985 | Hargest, III | 182/36 |
| 5,156,233 | A | * | 10/1992 | Olsen et al. | 182/3 |
| 5,269,227 | A | * | 12/1993 | Warren et al. | 105/29.1 |
| 5,271,481 | A | * | 12/1993 | Rich | 182/3 |
| 5,297,651 | A | * | 3/1994 | Vandelinde | 182/3 |
| 6,148,580 | A | * | 11/2000 | Weir | 52/651.1 |
| 6,269,904 | B1 | * | 8/2001 | Morhaus | 182/36 |
| 6,315,138 | B1 | * | 11/2001 | Dyson | 212/336 |
| 6,389,618 | B1 | * | 5/2002 | Flynn | 5/81.1 R |
| 6,729,436 | B1 | * | 5/2004 | Yeh | 182/36 |
| 6,890,288 | B2 | * | 5/2005 | Bingham | 482/69 |
| 7,175,534 | B2 | * | 2/2007 | Liggett | 472/15 |
| 7,275,710 | B2 | * | 10/2007 | VanDruff et al. | 244/1 R |
| 7,303,049 | B1 | * | 12/2007 | Greenlee | 182/37 |
| 7,870,695 | B2 | * | 1/2011 | Manson et al. | 52/184 |
| 7,950,498 | B2 | * | 5/2011 | Yang et al. | 182/206 |
| 7,992,680 | B2 | * | 8/2011 | Small | 182/36 |
| 7,993,248 | B1 | * | 8/2011 | Rasmussen | 482/69 |
| 2002/0056590 | A1 | * | 5/2002 | Goldie et al. | 182/36 |
| 2010/0012426 | A1 | * | 1/2010 | Golden et al. | 182/36 |
| 2010/0078262 | A1 | * | 4/2010 | Townend et al. | 182/36 |

FOREIGN PATENT DOCUMENTS

| GB | 2406313 A | 3/2005 |
| GB | 2451835 A | 2/2009 |
| JP | 2003-093531 A | 4/2003 |
| WO | WO 2010/031133 A1 | 3/2010 |

* cited by examiner

*Primary Examiner* — Alvin Chin Shue
*Assistant Examiner* — Colleen M Chavchavadze
(74) *Attorney, Agent, or Firm* — Miller, Matthias & Hull (57) ABSTRACT

Personnel safety apparatus is provided on a machine to prevent users from falling while moving between access points on the machine. The apparatus includes a rail having a first end positioned adjacent a first user access point and a second end positioned adjacent a second user access point to define a rail path that spans a vertical elevation. A carrier is movably coupled to the rail and has a first mode, in which the carrier engages a fixed position on the rail, and a second mode, in which the carrier is permitted to move relative to the rail. A tether extends between a harness on the user and the carrier to secure the user to the machine.

12 Claims, 5 Drawing Sheets

PERSONNEL SAFETY APPARATUS FOR A MACHINE

TECHNICAL FIELD

This disclosure relates generally to personnel safety apparatus and methods, and more particularly to methods and apparatus for preventing injurious falls.

BACKGROUND

Many machines, such as large vehicles and ships, require a user to travel to various access points while the machine is both stationary and mobile. The access points may be internal to the machine, such as in a hull of a large ship. Alternatively, the access points may be external, such as in vehicles having elevated cabs and/or platforms that must be accessed by a user. The cab or platform access points may be elevated several feet above the ground surface, and therefore ladders, stairs, and handholds are often provided on the machine to allow the user to safely reach the desired access point. Additionally, the machine may include a railing around the perimeter of the elevated platform to prevent falls. While these safety measures help prevent falls, they require a certain level of dexterity and awareness by the user to be effective. Additionally, these measures typically have minimal utility once a user has lost his balance or is no longer in contact with the machine.

Other safety measures have been proposed that attempt to provide an additional level of safety to the user by independently supporting the user in the event of a fall. For example, British Application Publication No. BF 2,406,313 discloses a vehicle safety frame secured to a trailer bed of a truck. The frame includes a horizontally extending rail. A carriage runs inside the rail and carries a fall arrest block having retractable webbing. A harness worn by the user can be attached to the webbing. As the user moves vertically toward the rail, slack in the webbing is taken up by the fall arrest block. A break mechanism in the fall arrest block prevents the webbing from rapidly extending out of the block, such as during a fall. The user must climb a ladder without any attached safety feature, however, to initially retrieve the webbing for attachment to the harness. Additionally, the carriage is free to roll along the rail during use, thereby subjecting the user to unintended and uncontrolled lateral movement while supported by the webbing after a fall.

The previously proposed safety measures noted above do not adequately address fall safety in elevated cabs and platforms that require a user to routinely traverse a change in vertical elevation to reach desired access points on the machine. These limitations are exacerbated in large machines, such as track-type tractors, large wheel loaders, hydraulic excavators, and mining vehicles, where the change in vertical elevation is pronounced.

SUMMARY OF THE DISCLOSURE

According to certain aspects of this disclosure, personnel safety apparatus is provided for a machine having a support platform defining at least a first user access point and a second user access point. The personnel safety apparatus includes a rail coupled to the machine and having a first end positioned adjacent the first user access point and a second end positioned adjacent the second user access point to define a first rail path having a portion that spans a vertical elevation. A carrier is movably coupled to the rail and has a first mode, in which the carrier engages a fixed position on the rail, and a second mode, in which the carrier is permitted to move relative to the rail. The carrier further includes a connector for attachment to a tether coupled to the user.

In another aspect of the disclosure that may be combined with any of these aspects, the rail includes a slot having a plurality of discrete locking recesses and the carrier includes a post coupled to the connector and extending through the slot, wherein the post engages a selected locking recess in the first mode, and wherein the post is disengaged from the locking recesses in the second mode.

In another aspect of the disclosure that may be combined with any of these aspects, the rail defines an internal chamber and the carrier includes a head slidably disposed in the internal chamber and a resilient member coupling the head to the connector, the resilient member providing a biasing force oriented to urge the head into engagement with the rail so that the carrier is normally in the first mode, wherein a manual force applied to the connector and sufficient to overcome the biasing force places the carrier in the second mode.

In another aspect of the disclosure that may be combined with any of these aspects, the rail is formed as a channel defining an interior chamber and a plurality of lever assemblies are coupled to the rail. Each lever assembly includes a pin coupled to the rail and having an interior end disposed in the interior chamber and an exterior end disposed outside of the interior chamber, a flapper disposed in the interior chamber, the flapper including a fixed end coupled to the pin interior end and a free end, the flapper being rotatable about the pin between an engaged position, in which the free end engages an abutment surface of the rail, and a disengaged position, in which the free end is spaced from the abutment surface, and a spring disposed between the flapper and the rail and configured to bias the flapper toward the engaged position.

In another aspect of the disclosure that may be combined with any of these aspects, each lever assembly further includes a lever coupled to the exterior end of the pin.

In another aspect of the disclosure that may be combined with any of these aspects, the carrier includes a carrier head and the rail includes a tortuous slot sized to slidably receive the carrier head, the tortuous slot including a plurality of stops configured to engage the carrier head.

In another aspect of the disclosure that may be combined with any of these aspects, the machine includes a ladder located near a rear of the machine defining the first user access point, and a cabin located near a front of the machine having an entrance defining the second user access point.

In another aspect of the disclosure that may be combined with any of these aspects, the rail includes at least a first rail segment having a first segment end and a second rail segment having a second segment end, wherein the first segment end is coupled to the second segment end by a joint.

In another aspect of the disclosure that may be combined with any of these aspects, the joint is configured to permit the carrier to transition from the first rail segment to the second rail segment.

In another aspect of the disclosure that may be combined with any of these aspects, the joint interrupts the first rail path so that the first segment end and second segment end are terminal ends, and in which the carrier is coupled to the first rail segment, and further comprising a second carrier coupled to the second rail segment.

In another aspect of the disclosure that may be combined with any of these aspects, the support platform of the machine further defines a third user access point, and in which the rail further defines a second rail path extending between the first user access point of the machine and the third user access point of the machine.

In another aspect of the disclosure that may be combined with any of these aspects, the rail includes a first rail segment defining at least a portion of the first rail path, and a second rail segment defining at least a portion of the second rail path.

In another aspect of the disclosure that may be combined with any of these aspects, a machine includes a support platform defining at least a first user access point and a second user access point. A rail is coupled to the machine and has a first end positioned adjacent the first user access point and a second end positioned adjacent the second user access point to define a first rail path having a portion that spans a vertical elevation. A carrier is movably coupled to the rail, the carrier having a first mode, in which the carrier engages a fixed position on the rail, and a second mode, in which the carrier is permitted to move relative to the rail, the carrier further including a connector. A tether has a first end releasably coupled to the connector of the carrier and a second end configured for attachment to a user.

DETAILED DESCRIPTION

Personnel safety apparatus for use on a machine are disclosed which prevent falls and resulting injury to a user. In the exemplary embodiments, the machine includes platforms, stairs, and other support structures that permit a user to move to various access points on the machine. Some of the access points are used for ingress and egress from the machine, while others may be used during inspection and maintenance of the machine or its operation. While the exemplary embodiments illustrate access points that are external to the machine, the machine may additionally or alternatively have access points located within an internal space of the machine. In addition to conventional safety measures, such as railings and handholds, the machine also includes safety apparatus that includes a rail and a carrier. The rail is coupled to the machine and defines one or more rail paths that travel adjacent the access points on the machine. The carrier is movably coupled to the rail and has a first mode, in which the carrier engages a fixed position on the rail, and a second mode, in which the carrier may move relative to the rail. Switching the carrier between modes may be performed manually, such as by pushing or manipulating a portion of the carrier to disengage it from the rail, or automatically, such as by permitting movement of the carrier only below a speed threshold. A tether has a first end releasably coupled to the carrier and a second end releasably coupled to the user. During use, the user may be wearing a harness that is attached to one end of the tether. The user attaches the other end of the tether to a carrier coupled to the rail. The carrier is placed in the second mode to permit the user to traverse from one access point to another. If the user begins to fall, the carrier returns to the first mode (again either manually, such as by release of the carrier, or automatically, such as by the carrier exceeding the speed threshold) to engage the rail, so that the tether limits the distance that the user may fall.

Figure 1:
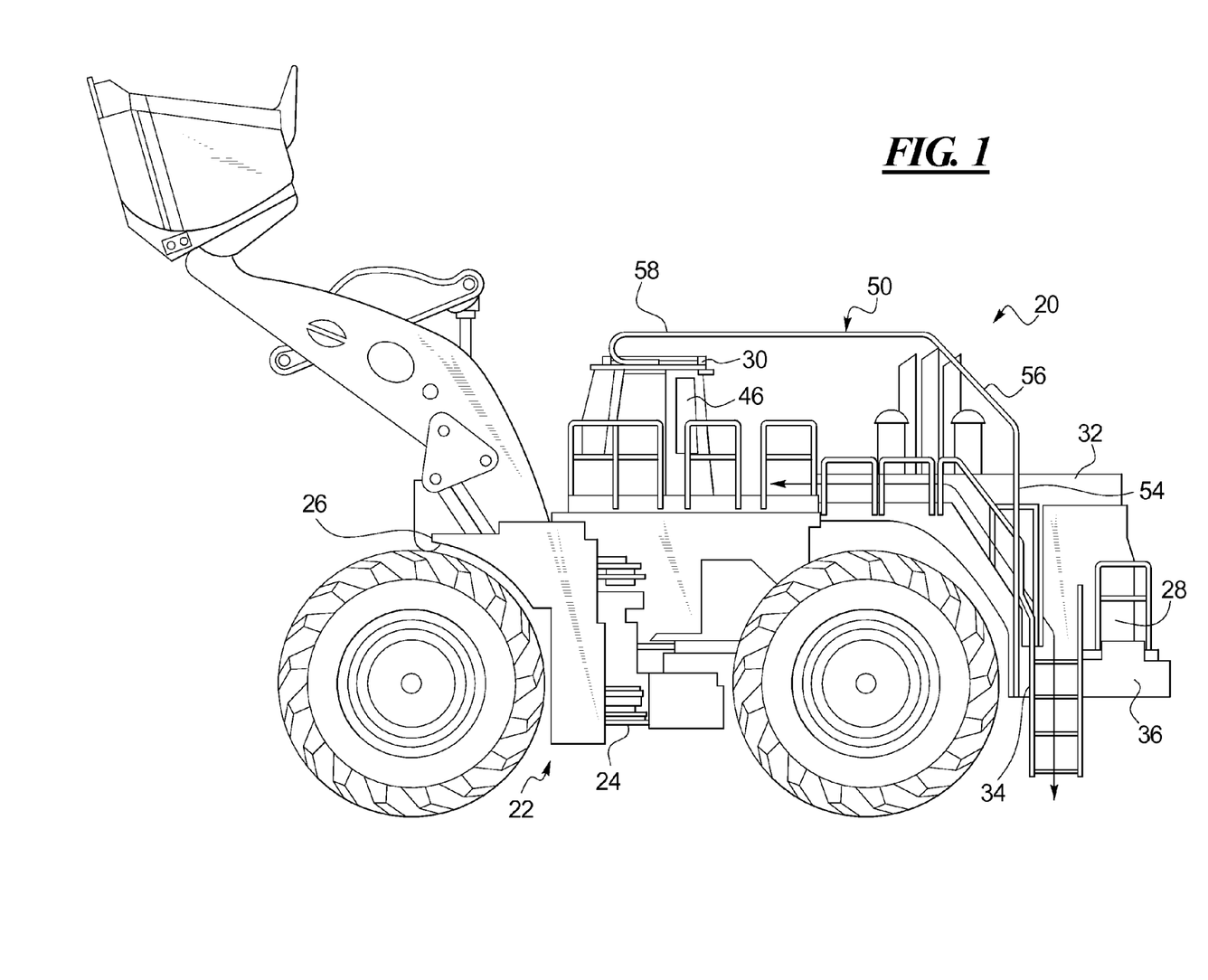
FIG. 1 is a side elevation view of a wheel loader incorporating personnel safety apparatus according to the present disclosure.

Referring specifically to FIG. 1, a first embodiment of the personnel safety apparatus 20 is shown on a machine, such as a wheel loader 22. The wheel loader 22 is used merely as one example of a machine on which the personnel safety apparatus 20 may be used, as it will be understood that the apparatus may be used on any machine having access points serviced by support structures such as platforms, ladders, and stairs. Other suitable machines include, but are not limited to, track-type tractors, hydraulic excavators, and mining trucks. The exemplary wheel loader 22 includes a chassis 24 having a front end 26 and a rear end 28. A cab 30 is located near the front end 26 in which controls for the wheel loader 22 are housed. An engine, hydraulics, and other components may be enclosed by a housing 32 located near the rear end 28 of the wheel loader 22.

Figure 2:
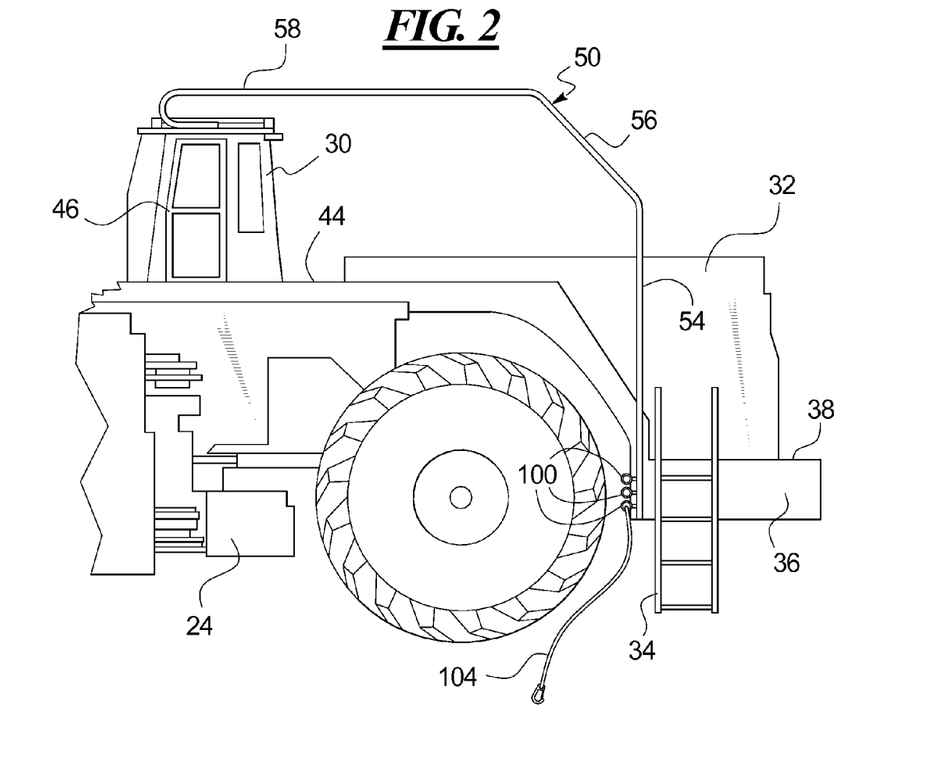
FIG. 2 is a side elevation view of a portion of FIG. 1 with certain structure removed for clarity.
Figure 3:
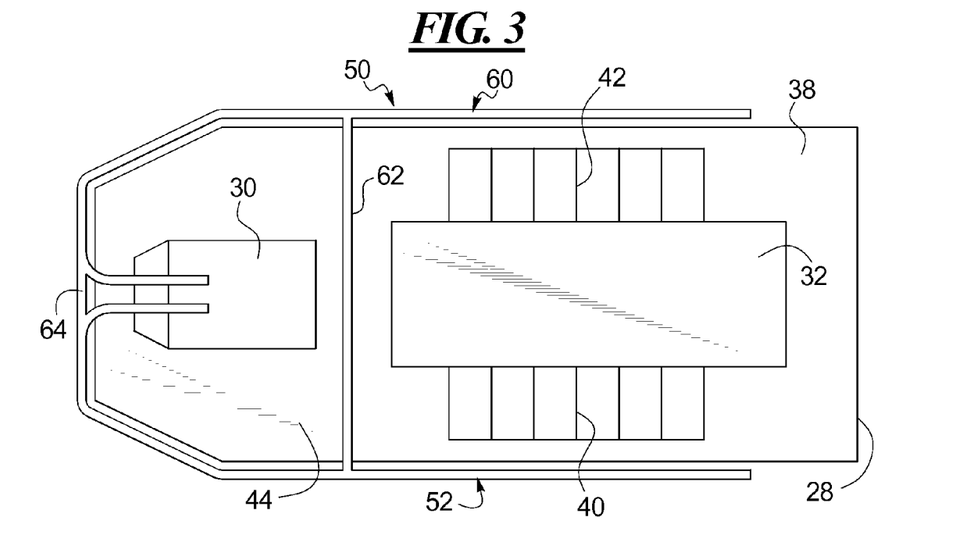
FIG. 3 is a top plan view of FIG. 2 showing the support structure of the wheel loader and the rail configuration of the personnel safety apparatus.

Access support structures are mounted on the chassis 24 to provide user access to different locations on the wheel loader 22. As best shown in FIGS. 1-3, a ladder 34 is provided near a bumper 36 at the rear end 28. The ladder 34 extends from a point adjacent the ground to a lower platform 38 providing access to the rear end 28 of the wheel loader 22. Two sets of stairs 40, 42 lead from the lower platform 38 to an upper platform 44, which provides access to the front end 26 of the wheel loader 22. In this exemplary embodiment, therefore, the access support structures include platforms located at different elevations as well as ladders and stairs that traverse vertical distances to permit a user to access those platforms.

The access support structures allow the user to navigate to access points on the wheel loader 22 during operation or maintenance. Some of the access points are used simply for ingress onto or egress from the wheel loader 22. For example, the ladder 34 may be a first access point used for entry or exit. A door 46 of the cab 30 may be a second access point used for entry into or exit from the wheel loader 22. Other access points may be used during inspection or operation of the machine. The upper platform 44, for example, may provide a third access point used for viewing operation of the wheels, bucket, or other structure of the wheel loader 22. Additionally, the lower platform 38 may provide a fourth access point that allows the user to access the housing 32 during maintenance.

The foregoing are only exemplary, as the support structures may further provide additional access points for use during operation or maintenance of the wheel loader 22.

As shown in FIGS. 1-3, the personnel safety apparatus 20 includes a rail 50 to provide a support for suspending the user in the event of a fall. The rail 50 is coupled to the wheel loader 22 and is generally located above the support structures, as best shown in FIGS. 2 and 3 (where railings and other wheel loader components have been removed for clarity). In the illustrated embodiment, the rail 50 includes a side rail 52 having a rear section 54 that is positioned adjacent the ladder 34 and extends generally vertically. An intermediate section 56 of the rail 50 is positioned above the stairs 40 and a rear portion of the upper platform 44, and is slanted to generally follow the stair path. A front section 58 of the rail 50 is positioned above a front portion of the upper platform 44 and extends generally horizontal. As best seen in FIG. 3, the rail 50 may include a second side rail 60 that is substantially identical to the side rail 52. Additionally, an intermediate transverse rail 62 may extend between the intermediate sections of the side rails 52, 60, and a front transverse rail 64 may extend between the front sections of the side rails 52, 60. The second side rail 60 and transverse rails 62, 64 provide access to different areas of the wheel loader 22 and/or provide different rail paths, as described in greater detail below.

The rail 50 defines multiple rail paths extending between access points on the wheel loader. For example, the rail 50 may define a first rail path extending from the ladder 34 to the cab door 46 that includes the rail rear section 54, the rail intermediate section 56, and the rail front section 58. Additionally, the rail 50 may define a second rail path from the cab door 46 to the lower platform 38 that includes the rail front section 58, the intermediate transverse rail 62, and a portion of the second side rail 60. The rail 50 may define yet further rail paths between other access points using other combinations of rail sections.

Figure 4:
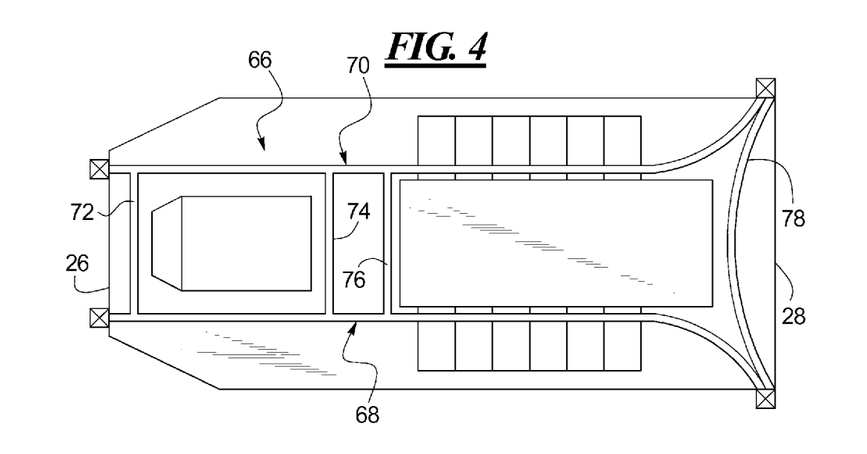
FIG. 4 is a top plan view of an alternative rail configuration for the personnel safety apparatus.

The rail may have other configurations than that shown in FIGS. 1-3. For example, FIG. 4 illustrates an alternative rail 66 having first and second side rails 68, 70 extending from the front end 26 to the rear end 28 of the wheel loader 22. The side rails 68, 70 are positioned closer to the center of the wheel loader 22, as opposed to the rail 50 of FIGS. 1-3, where the side rails 52, 60 are positioned along a perimeter of the wheel loader 22. The rail 66 further includes a front transverse rail 72, a first intermediate transverse rail 74, a second intermediate transverse rail 76, and a rear transverse rail 78 extending between the side rails 68, 70.

Figure 5:
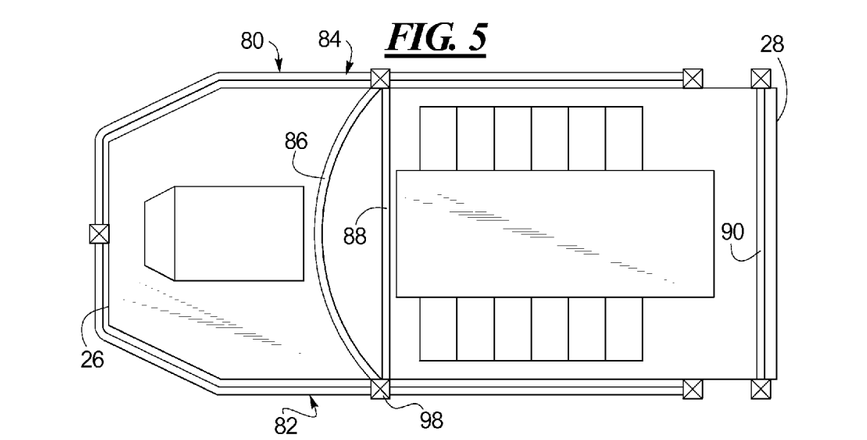
FIG. 5 is a top plan view of yet another alternative rail configuration for the personnel safety apparatus.

Yet another rail configuration is illustrated in FIG. 5. A rail 80 includes side rails 82, 84 that extend along respective lateral sides of the wheel loader 22 from the front end 26 to the rear end 28. The front ends of the side rails 82, 84 may be coupled as shown. An arcuate transverse rail 86 and a linear transverse rail 88 extend between the side rails 82, 84. Additionally, the rail 80 includes a stand-alone, rear transverse rail 90 that extends along the rear end 28 of the wheel loader 22.

Figure 6:
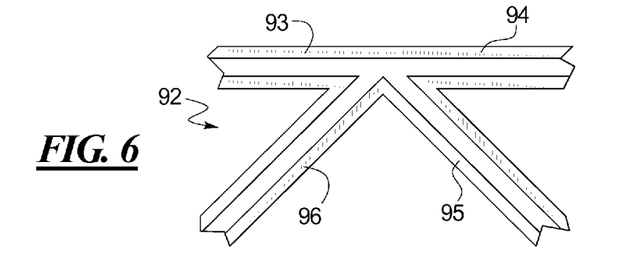
FIG. 6 is an enlarged detail view of a joint showing converging rail segments.

The rails 50, 66, 80 disclosed herein may include multiple rail segments that meet at a junction or joint. An exemplary joint 92 is illustrated in FIG. 6 that includes a first rail segment 93, a second rail segment 94, a third rail segment 95 and a fourth rail segment 96. The rail segments 93-96 define portions of rail paths. In the illustrated embodiment, the rail segments 93-96 are configured so that the rail paths passing through the joint 92 are not interrupted. Conversely, as shown in FIG. 5, an alternative joint 98 may interrupt the rail paths, in which case the ends of the rail segments adjacent the joint 98 are terminal ends. The joint 98 in FIG. 5 may also serve as a support for the rail.

The personnel safety apparatus 20 further includes a carrier 100 that is movably coupled to the rail 50, and therefore provides a movable connection point between the user and the rail 50. The carrier 100 includes a connector 102 projecting away from the rail 50 and accessible to the user for attachment to a tether 104 (FIG. 2). One end of the tether 104 may be releasably coupled to the connector 102, while an opposite end of the tether 104 may be releasably coupled to a harness (not shown) worn by the user.

Figures 7, 8, 9:
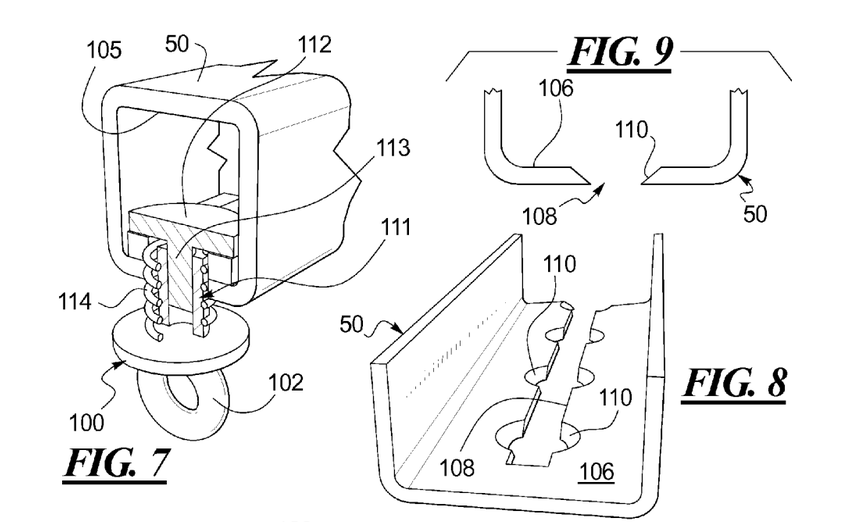
FIG. 7 is an enlarged perspective view of one embodiment of a rail and carrier system that can be used in the personnel safety apparatus.
FIG. 8 is an enlarged perspective view of a portion of the rail of FIG. 7.
FIG. 9 is an enlarged side elevation view, in cross-section, of a portion of the rail of FIG. 7.

The carrier 100 is configured to have a first or engaged mode, in which the carrier 100 engages a fixed position on the rail 50, and a second or disengaged mode, in which the carrier 100 is free to move relative to the rail. In the embodiment shown in FIGS. 7-9, the rail 50 is formed as a square tube defining an internal chamber 105. A wall 106 of the rail 50 is formed with a slot 108 that extends longitudinally along a length of the rail. Circular recesses 110 are formed in the wall 106 at discrete locations along the slot 108, so that the recesses 110 communicate with the slot. The carrier 100 includes a head 112 slidably disposed in the internal chamber 105. A cylinder 111 extending from the connector 102 slidably receives a post 113 extending from the head 112, and a resilient member, such as a spring 114, resiliently couples the head 112 to the connector 102 to provide a biasing force oriented to urge the head 112 into engagement with the rail wall 106, thereby placing the carrier 100 in the first mode. When the head 112 is aligned with a recess 110, the carrier 100 is securely held in fixed position relative to the rail 50. A manual force applied to the connector 102 and sufficient to overcome the biasing force disengages the carrier 100 from the rail, placing the carrier 100 in the second mode. Subsequently, when the connector 102 is released, the carrier 100 automatically returns to the first mode, thereby locking the carrier 100 in place on the rail 50.

Figure 10:
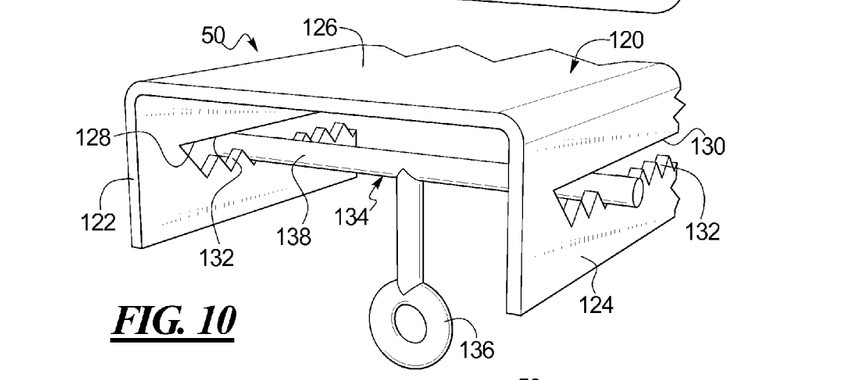
FIG. 10 is a perspective view of an alternative embodiment of a rail and carrier system that can be used in the personnel safety apparatus.

In an alternative embodiment shown in FIG. 10, the rail 50 may be formed as a channel 120 having two side walls 122, 124 joined by an intermediate wall 126. Slots 128, 130 are formed in respective side wall 122, 124 and include a series of locking recesses, such as ratchet teeth 132. A carrier 134 includes a connector 136 coupled to an anchor post 138. The anchor post 138 is sized to extend through the slots 128, 130. The ratchet teeth 132 may be shaped and oriented so that the anchor post 138 is held in a fixed position when a downwardly directed force is applied to the anchor post. In this embodiment, the carrier 134 is normally in the first mode under the normal force of gravity. To place the carrier 131 in the second mode, the user may grasp and raise the connector 136 so that it disengages the ratchet teeth 132, thereby enabling the carrier 134 to move relative to the rail. If the user should start to fall, the carrier 134 would be dropped or otherwise return into engagement with the ratchet teeth 132, thereby holding the carrier 134 in a fixed position relative to the rail.

Figure 11:
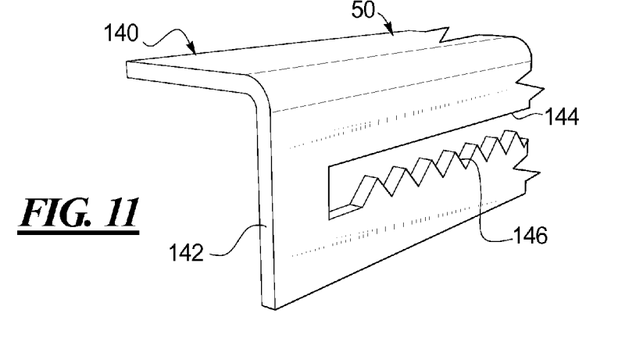
FIG. 11 is a perspective view of yet another alternative embodiment of a rail that can be used in the personnel safety apparatus.

A further alternative embodiment is illustrated in FIG. 11. This embodiment is similar to that of FIG. 10, however the rail 50 is formed as an angle iron 140 having only one side wall 142. A slot 144 is formed in the side wall 142 and includes ratchet teeth 146. In this embodiment, the carrier would extend only through the single slot 144, but would otherwise function in a manner similar to the embodiment of FIG. 10.

Figures 12, 13, 14:
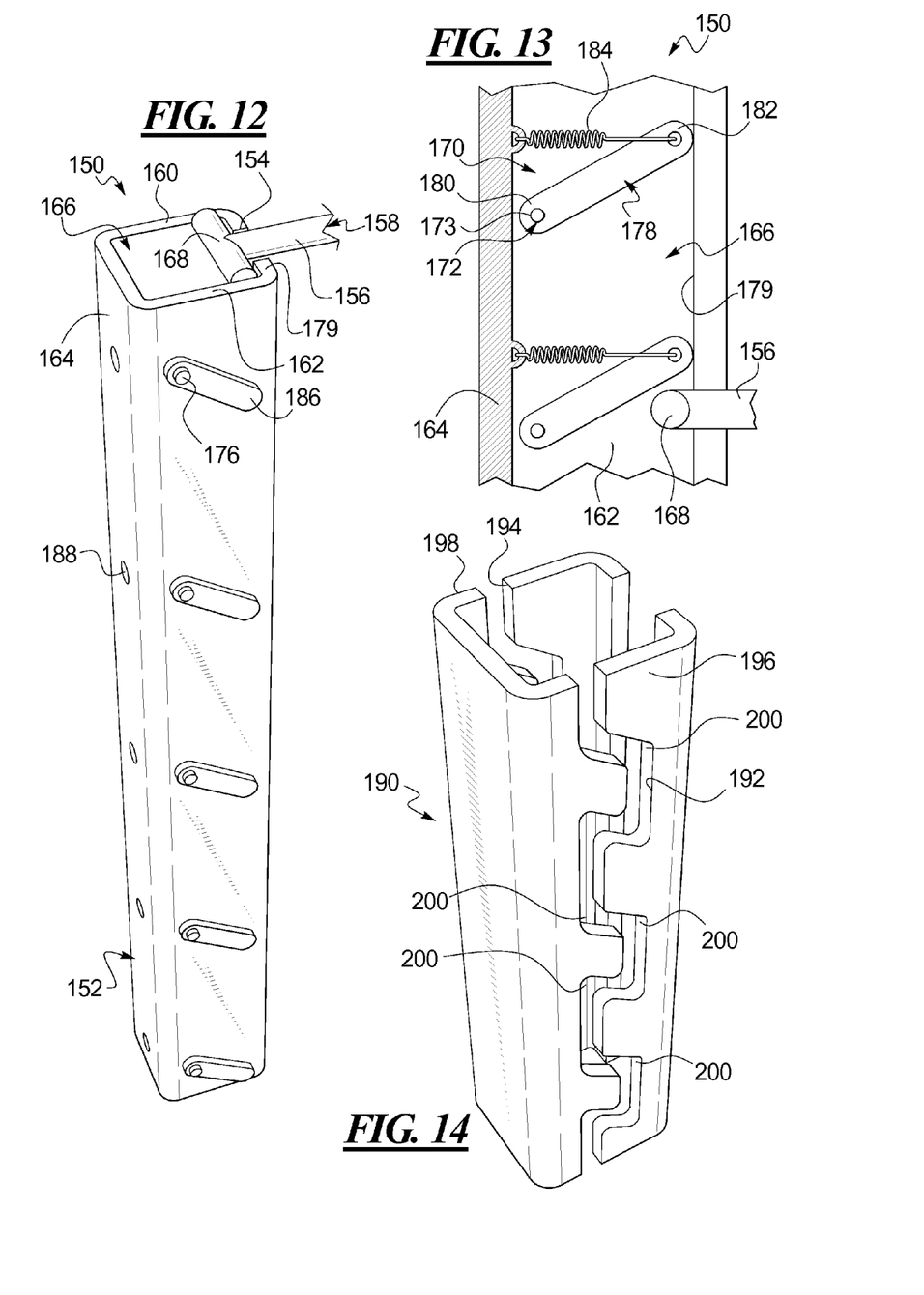
FIG. 12 is a perspective view of still another alternative embodiment of a rail that can be used in the personnel safety apparatus.
FIG. 13 is a side elevation view, in cross-section, of the rail shown in FIG. 12.
FIG. 14 is a perspective view of a further embodiment of a rail that can be used in the personnel safety apparatus.

FIGS. 12 and 13 illustrate yet another embodiment of a rail adapted to span a vertical distance. The rail 150 is formed as a C-shaped channel 152 defining a slot 154 sized to receive an arm 156 of a carrier 158. The C-shaped channel 152 also includes two side walls 160, 162 and an intermediate wall 164. The channel 152 defines an interior chamber 166 along which a head 168 of the carrier 158 may freely slide.

A plurality of spring loaded lever assemblies 170 are coupled to the side wall 160 that readily permit movement of the carrier 158 in a first direction while generally preventing movement in a second, opposite direction absent additional user manipulation. Each spring loaded lever assembly 170 includes a pin 172 extending through the side wall 160 to define an interior end 173 disposed inside the interior chamber 166 an exterior end 176 disposed outside of the channel 152. A flapper 178 has a base end 180 coupled to the interior end 173 of the pin 172 and a free end 182. The flapper 174 is sized and configured so that the free end 182 engages an interior surface of abutment wall 179 of the channel 152 when the flapper 174 is in an engaged position. A resilient member, such as compression spring 184, extends between the channel 152 and the flapper 178, thereby to bias the flapper free end 182 against the abutment wall 179. In the engaged position, the flapper 174 prevents the carrier head 168 from moving in a first direction (i.e., downwardly as shown). A force applied to the flapper 174 may overcome the spring bias force to pivot the flapper 174 around the pin 172 to a disengaged position, in which the free end 182 is spaced from the abutment wall 179. The force may be provided by the carrier head 168 moving in a second direction (i.e., upwardly as shown in FIG. 13), so that movement in the second direction is automatically permitted. Specifically, the carrier head 168 engages the free end 182 with sufficient force to overcome the spring bias force so that the flapper 174 rotates to the disengaged position, thereby allowing the carrier head 168 to slide past the flapper 174. Alternatively, the flapper 174 may be manually moved to the disengaged position. To facilitate manual manipulation of the flapper 174, a lever 186 may be coupled to the pin exterior end 176. The user may grasp and rotate the lever 186. Force applied to the lever 186 is transferred by the pin 172 to the flapper 178, thereby moving the flapper 174 to the disengaged position.

In operation, the flapper 174 is normally biased toward the engaged position. As noted above, movement of the carrier head 168 in the second direction (i.e., upward) is automatically permitted. Should the user move in the first direction (i.e., downward), the engaged position of the flapper 178 will limit the amount of distance the carrier head 168 may travel. The user may manipulate each flapper 178 to the disengaged position by grasping and turning the lever 186, thereby permitting movement of the carrier head 168 in the downward direction. During a fall, the user will release the lever 186 so that the flapper 178 automatically returns to the engaged position, thereby limiting movement of the carrier head 168 in the first direction.

Each lever 186 also provides a visual indication to the user that the flapper 178 is in the engaged position, thereby providing the user assurance that the safety device is engaged. Additionally or alternatively, indicator lights, such as LEDs 188, may be provided that are illuminated when the flapper 178 is in the engaged position to communicate to the user that the safety device is engaged. The LEDs may be operatively coupled to a sensor that monitors the position of the flapper 178 and triggers illumination of the associated LED 188 when the flapper 178 is in the engaged position.

FIG. 14 illustrates another embodiment of a rail 190 having tortuous slots 192, 194 that limit inadvertent movement of the carrier head. Each slot 192, 194 traverses back and forth across an associated wall 196, 198 of the rail 190. Each slot 192, 194 may include stops 200 that are formed where the direction of the slot abruptly changes. The stops 200 limit the travel of the carrier head along the slot, thereby preventing inadvertent travel of the carrier, such as what occurs during a fall. The carrier head may be manually manipulated to advance it past the stops 200, thereby allowing the carrier head to traverse the entire length of the slot.

While two slots 192, 194 are shown in FIG. 14, the rail 190 may have a single slot or more than two slots. Additionally, while the rail 190 is shown as a unitary, C-shaped channel, it may be provided as an angle iron or other structure. Additionally, the rail 190 need not be a unitary structure but instead may be formed from separate components, such as flat plates that are assembled together.

INDUSTRIAL APPLICABILITY

The personnel safety apparatus embodiments disclosed herein provide systems for better securing users to machines, thereby preventing falls. In operation, a user wearing a harness may approach a point of ingress to the machine, such as the ladder 34 of wheel loader 22. The tether 104 may be coupled between the harness and the connector 102 of a selected carrier 100. The carrier 100 normally may be in the first mode, in which the carrier 100 engages a fixed position on the rail 50. To permit movement along the ladder and to a different position on the wheel loader 22, the user may grasp the connector 102 and raise the carrier 100, thereby placing the carrier 100 in the second or disengaged mode that permits movement of the carrier 100 relative to the rail 50. During travel from the first access point to the second access point, should the user lose his balance and begin to fall, the natural tendency would be to release the carrier 100. Once released, the carrier 100 would return to the first mode and engage a fixed position of the rail, thereby limiting the distance the user would fall and minimizing or preventing injury.

The rail 50 may include multiple sections laid out in a configuration that permits the user to access the desired points on the machine. The rail configuration may include joints at which multiple rail segments meet. The joints may be configured to permit a smooth transition of the carrier 100 between rail segments, thereby allowing the user to remain secured to the same carrier 100 at all times.

Alternatively, the joints may be configured such that they interrupt the rail paths defined by the rail segments, in which case the rail segments have terminal ends at the joints. When the rail segments have terminal ends converging on a joint, a dedicated carrier 100 may be provided for each rail segment, so that the user may release the tether 104 from a first carrier coupled to a first rail segment and couple to a second carrier provided on the second rail segment. Each rail segment may include multiple dedicated carriers to permit multiple users or to ensure that a carrier will be available at each terminal end of the rail segment.

Still further, the user may have two tethers 104 to allow the user to transition from one rail segment to another while remaining secured to the rail 50 at all times. Again, where the rail segments have terminal ends converging on a joint, the first tether 104 may be coupled to the first carrier on the first rail segment. The user may then couple a second tether to a second carrier on the second rail segment prior to releasing the first tether from the first carrier, thereby to secure the user to the machine as he transitions across the joint.

The various types of rail styles disclosed herein may be used together on a single machine. For example, the rail styles illustrated in FIGS. 7-11 may be used in generally horizontally extending sections of the rail, while the rail styles illustrated in FIGS. 12-14 may be used in generally vertically extending sections of the rail.

What is claimed is:

1. A personnel safety apparatus for a machine having a support platform defining at least a first user access point and a second user access point, the personnel safety apparatus comprising:
 a rail coupled to the machine and having a first end positioned adjacent the first user access point and a second end positioned adjacent the second user access point, the rail defining a first rail path and an internal chamber;
 a carrier movably coupled to the rail, the carrier having a first mode, in which the carrier engages a fixed position on the rail, and a second mode, in which the carrier is permitted to move relative to the rail, the carrier further including a connector, a head slidably disposed in the internal chamber and a resilient member coupling the head to the connector, the resilient member providing a biasing force oriented to urge the head into engagement with the rail so that the carrier is normally in the first mode, wherein a manual force applied to the connector and sufficient to overcome the biasing force places the carrier in the second mode; and
 a tether having a first end releasably coupled to the connector of the carrier and a second end configured for attachment to a user.

2. The personnel safety apparatus of claim 1, in which the rail includes a slot having a plurality of discrete locking recesses, and in which the carrier includes a post coupled to the connector and extending through the slot, wherein the post engages a selected locking recess in the first mode, and wherein the post is disengaged from the locking recesses in the second mode.

3. The personnel safety apparatus of claim 1, in which the machine includes a ladder located near a rear of the machine defining the first user access point, and a cabin located near a front of the machine having an entrance defining the second user access point.

4. The personnel safety apparatus of claim 1, in which the rail includes at least a first rail segment having a first segment end and a second rail segment having a second segment end, wherein the first segment end is coupled to the second segment end by a joint.

5. The personnel safety apparatus of claim 4, in which the joint is configured to permit the carrier to transition from the first rail segment to the second rail segment.

6. The personnel safety apparatus of claim 4, in which the joint interrupts the first rail path so that the first segment end and second segment end are terminal ends, and in which the carrier is coupled to the first rail segment, and further comprising a second carrier coupled to the second rail segment.

7. The personnel safety apparatus of claim 1, in which the support platform of the machine further defines a third user access point, and in which the rail further defines a second rail path extending between the first user access point of the machine and the third user access point of the machine.

8. The personnel safety apparatus of claim 7, in which the rail includes a first rail segment defining at least a portion of the first rail path, and a second rail segment defining at least a portion of the second rail path.

9. A machine comprising:
 a support platform defining at least a first user access point and a second user access point;
 a rail coupled to the machine and having a first end positioned adjacent the first user access point and a second end positioned adjacent the second user access point, the rail defining a first rail path and an internal chamber;
 a carrier movably coupled to the rail, the carrier having a first mode, in which the carrier engages a fixed position on the rail, and a second mode, in which the carrier is permitted to move relative to the rail, the carrier further including a connector, a head slidably disposed in the internal chamber and a resilient member coupling the head to the connector, the resilient member providing a biasing force oriented to urge the head into engagement with the rail so that the carrier is normally in the first mode, wherein a manual force applied to the connector and sufficient to overcome the biasing force places the carrier in the second mode; and
 a tether having a first end releasably coupled to the connector of the carrier and a second end configured for attachment to a user.

10. The machine of claim 9, in which the rail includes a slot having a plurality of discrete locking recesses, and in which the carrier includes a post coupled to the connector and extending through the slot, wherein the post engages a selected locking recess in the first mode, and wherein the post is disengaged from the locking recesses in the second mode.

11. The machine of claim 9, in which the support platform of the machine further defines a third user access point, and in which the rail further defines a second rail path extending between the first user access point of the machine and the third user access point of the machine.

12. The machine of claim 11, in which the rail includes a first rail segment defining at least a portion of the first rail path, and a second rail segment defining at least a portion of the second rail path.

* * * * *